US009136776B2

(12) United States Patent
Wallmeier et al.

(10) Patent No.: US 9,136,776 B2
(45) Date of Patent: Sep. 15, 2015

(54) CURRENT SUPPLY ARRANGEMENT FOR THE RECTIFYING THREE-PHASE AC CURRENT INTO MULTI-PULSE DC CURRENT

(76) Inventors: Peter Wallmeier, Lippstadt (DE); Paul Maiberg, Anroechte (DE); Gregor Dueppe, Warstein (DE)

( * ) Notice: Subject to any disclaimer, the term of this patent is extended or adjusted under 35 U.S.C. 154(b) by 135 days.

(21) Appl. No.: 13/298,481

(22) Filed: Nov. 17, 2011

(65) Prior Publication Data

US 2012/0188804 A1 Jul. 26, 2012

(30) Foreign Application Priority Data

Jan. 24, 2011 (EP) .................................. 11151910

(51) Int. Cl.
 *H02M 7/08* (2006.01)
 *H02M 7/06* (2006.01)
 *H01F 30/12* (2006.01)
 *H01F 27/40* (2006.01)

(52) U.S. Cl.
 CPC ................ *H02M 7/06* (2013.01); *H01F 30/12* (2013.01); *H01F 2027/408* (2013.01)

(58) Field of Classification Search
 USPC ......... 363/4, 5, 6, 7, 8, 34, 37, 65, 67, 69, 70, 363/71, 78, 89, 126; 336/116, 145, 146, 336/148, 150; 323/255, 256, 258, 340, 245, 323/246, 262, 343
 See application file for complete search history.

(56) References Cited

U.S. PATENT DOCUMENTS

| | | | |
|---|---|---|---|
| 2,085,123 A * | 6/1937 | Rose | 363/6 |
| 3,474,321 A * | 10/1969 | Ainsworth | 363/94 |
| 3,535,617 A | 10/1970 | Landis | |
| 3,845,437 A | 10/1974 | Goodman | |
| 4,206,395 A * | 6/1980 | Okuyama et al. | 318/716 |
| 4,831,352 A * | 5/1989 | Sokai et al. | 336/12 |
| 5,969,511 A * | 10/1999 | Asselman et al. | 323/258 |
| 6,256,213 B1* | 7/2001 | Illingworth | 363/89 |
| 6,841,976 B1* | 1/2005 | Sen et al. | 323/216 |
| 7,112,946 B2* | 9/2006 | Owen | 323/255 |

FOREIGN PATENT DOCUMENTS

| | | |
|---|---|---|
| CN | 2 202 609 | 7/1995 |
| CN | 200 990 560 | 12/2007 |
| GB | 727 553 | 4/1955 |

OTHER PUBLICATIONS

Lappe, Rudolf; "Leistungselektronik"; Dec. 31, 1987, Veb Verlag Tecnik Berlin, XP002655361; pp. 184-187.
European Search Report dated Aug. 23, 2011.

* cited by examiner

*Primary Examiner* — Nguyen Tran
(74) *Attorney, Agent, or Firm* — Cohen & Hildebrand, PLLC

(57) ABSTRACT

A current supply arrangement (A, B) for rectifying three-phase current into multi-pulse DC current with at least one three-phase AC current transformer with a transformer core or three single-phase AC current transformers, each having a transformer core, wherein the three-phase AC current transformer includes three first secondary-side coils (L21, L22, L23), each of which is arranged on a corresponding leg of the transformer core, wherein each secondary side coil is arranged on a leg of the transformer cores, with at least one first rectifier having first converter valves (D1, D2, D3). The first converter valves (D1, D2, D3) are connected with the first secondary-side coils (L21, L22, L23) to form the first rectifier, wherein the current supply arrangement (A, B) includes means (S1, S2, S3) for changing the transformer ratio of the three-phase AC current transformer or the transformer ratios of the three single-phase AC current transformers.

14 Claims, 4 Drawing Sheets

Figure 1:
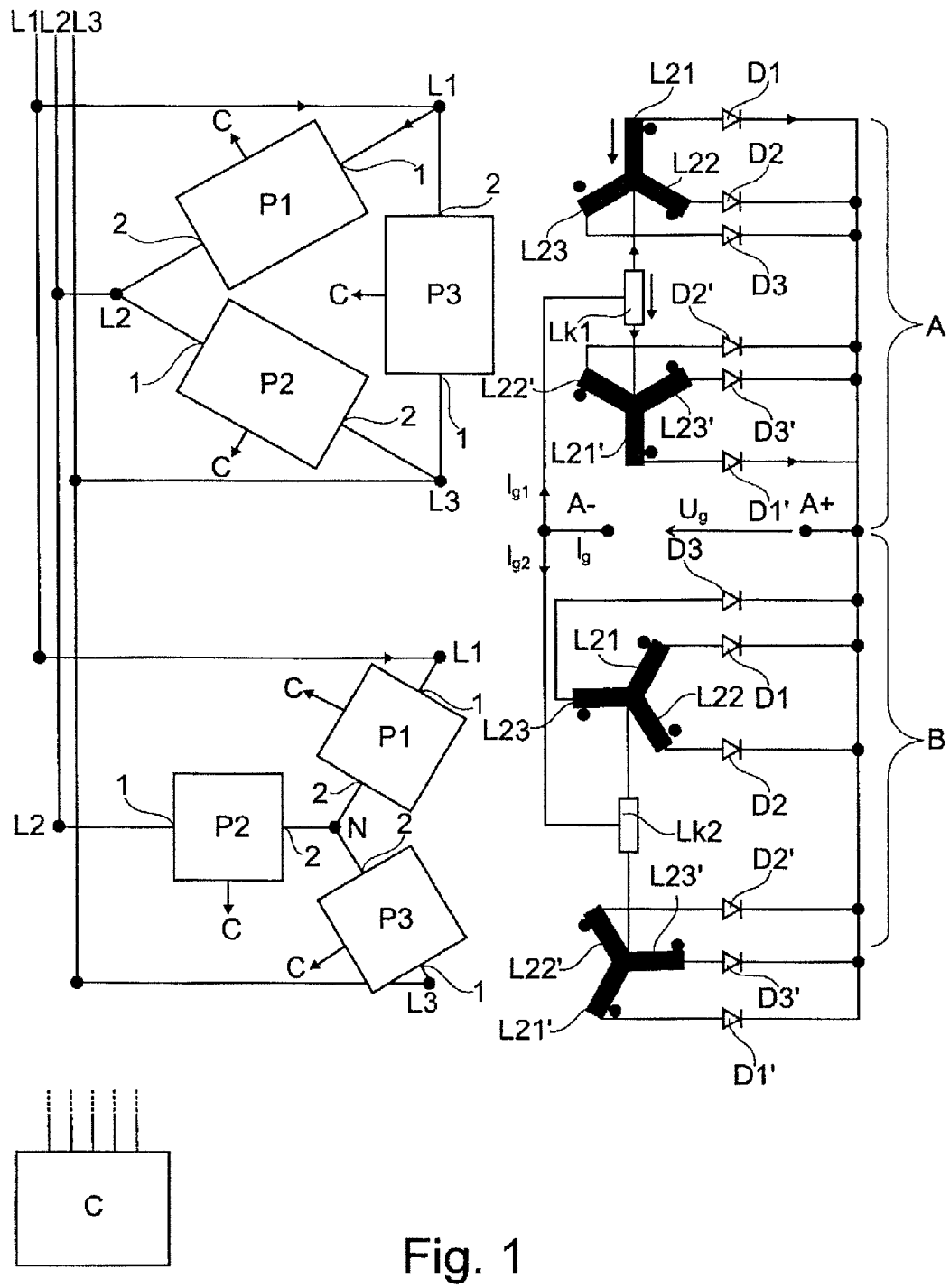

CURRENT SUPPLY ARRANGEMENT FOR THE RECTIFYING THREE-PHASE AC CURRENT INTO MULTI-PULSE DC CURRENT

BACKGROUND OF THE INVENTION (1) Field of the Invention

The present invention relates to a current supply arrangement for rectifying three-phase current into multi-pulse DC current
- with at least one three-phase AC current transformer with a transformer core or three single phase AC current transformers, each having a transformer core, wherein
- the three-phase AC current transformer comprises three first secondary-side coils, which each are arranged on a corresponding leg of the transformer core, or each of the three single-phase AC current transformers has a first secondary-side coil, wherein each secondary side coil is arranged on a leg of the transformer cores,
- with at least one first rectifier comprising first converter valves
- wherein the first converter valves are connected with the first secondary-side coils to the first rectifier.

(2) Description of Related Art

Such current supply arrangements are known from textbooks. For example, the textbook "Grundlagen der Leistungselektronik" (*Fundamentals of Power Electronics*), K. Heumann, ISBN 3-519-06110-4 describes a current supply arrangement, wherein secondary-side coils of a three-phase AC current transformer are connected with first converter valves to an M3-rectifier.

With the current supply arrangement described in the textbook, current from an AC circuit can be supplied to a DC load. A DC voltage can be obtained at the output of the current supply arrangement, wherein the magnitude of the DC voltage is determined essentially by the transformation ratio of the transformer. The magnitude of the DC voltage cannot be varied.

However, DC loads are known which require that DC voltages of different magnitudes are supplied in different situations. In a simple situation, a DC load is to be connected to DC voltages having two different magnitudes.

Different DC voltages at the output of an M3-rectifier can be realized by using controllable converter valves, as described in the same textbook. The controllable converter valves may be operated, for example, with phase-angle control. The voltage at the output of the rectifier can then be continuously adjusted at least over a certain range.

However, adjusting the voltage by phase-angle control has the disadvantage that due to the higher fraction of harmonics and the ensuing distortion reactive power, the power factor decreases with increasing phase angle controlling the controllable converter valves.

The invention therefore starts from the problem to improve a current supply arrangement of the aforedescribed type so that at least two output voltages can be provided with a high power factor. Another object of the invention is to provide a substantially constant DC voltage at the output of the rectifier.

BRIEF SUMMARY OF THE INVENTION

This problem is solved by the invention in that the current supply arrangement comprises means for changing of the transformer ratio of the three-phase AC current transformer or of the three single-phase AC current transformers. By changing the transformer ratio of the three-phase AC current transformer or of the three single-phase AC current transformers, different voltages can be supplied at the output of the rectifier, without the need for converter valves on the secondary side of the transformer(s) that allow secondary-side phase-angle control. In this way, a high power factor can be attained when operating the current supply arrangement with the output voltages determined by the preset transformer ratio of the transformer(s).

A current supply arrangement according to the invention may be configured such that
- the three-phase AC current transformer has three first primary-side coils or three second primary-side coils, which are each arranged on a leg together with a first secondary-side coil, or
- each of the three single-phase AC current transformers has a first primary-side coil and a second primary-side coil on one of the legs of its transformer core.

Means for changing the transformer ratio of such current supply arrangement may include controllable switches. With the controllable switches arranged in a switching arrangement according to the invention, each second primary-side coil can be connected directly or indirectly in series with the first primary-side coil
- on the same leg of the three-phase AC current transformer, or
- on the same transformer core of one of the single-phase AC current transformers.

A current supply arrangement according to the invention may include third primary-side coils. With the controllable switch, each third primary-side coil can be connected directly or indirectly in series with either the first primary-side coil or the first primary-side coil and the second primary-side coil
- on the same leg of the three-phase AC current transformer, or
- on the same transformer core of one of the single-phase AC current transformers.

In this context, connected directly in series is meant to indicate that the same current flows through each third primary-side coil as flows through the first primary-side coil and possibly the second primary-side coil on the same leg. In this context, connected indirectly in series is meant to indicate that a partial current flows through each third primary-side coil as flows through the first primary-side coil and possibly the second primary-side coil on the same leg.

With the first controllable switch and the second controllable switch, it may be possible in a current supply arrangement according to the invention to connect a parallel connection of the second primary-side coil and the third primary-side coil in series with the first primary-side coil
- on the same leg of the three-phase AC current transformer, or
- on the same transformer core of one of the single-phase AC current transformers.

The current supply arrangement may include power controllers for adjusting the power transmitted from the primary side of the three-phase AC current transformer to its secondary side or from the primary sides of the three single-phase AC current transformers to their secondary sides. The power transmitted from the current supply arrangement to a load connected to the output of the rectifier can be adjusted with these power controllers.

If the preset transformer ratio of the transformer(s) is selected such that a high primary-side voltage is transformed into a small secondary-side voltage of, for example, 9 V to 15 V, and a small primary-side current is transformed into a high secondary-side current of, for example, 9 kA, then the power control is advantageously performed on the primary side so as to eliminate switching of high currents.

The power controllers may include controllable switches. The power controllers may then establish the series connection or possibly parallel connection of the first, second and optionally third primary-side coils. The power controllers then also represent means for changing the transformer ratio of the three-phase AC current transformer or of the three single-phase AC current transformers.

The voltage arrangement may include a control means configured to control the power controllers, for example with voltage follower control.

The three-phase AC current transformer may be connected on the primary side in a Delta configuration. However, the three-phase AC current transformer may also be connected on the primary side in a star configuration. The star point on the primary side can then be connected via corresponding series-resonant circuits to a corresponding phase conductor terminal of the current supply arrangement.

The first converter valves may be connected with the first secondary-side coils to an M3-rectifier. However, rectifiers may also be connected using other topologies.

In a particular embodiment of the current supply arrangement, the three-phase AC current transformer may include three additional secondary-side coils, with each coil being arranged on a leg of the transformer core. Such current supply arrangement may include at least one second rectifier having second converter valves. These second converter valves may be connected with the second secondary-side coils to the second rectifier, in particular to an M3-rectifier.

The first M3-rectifier which includes the first converter valves and the second M3-rectifier which includes the second converter valves may be connected in parallel. Preferably, the first M3-rectifier and the second M3-rectifier are connected in an M3.2 rectifier circuit. An M3.2 rectifier circuit is also known as an interphase transformer circuit.

Compared to a parallel connection of two M3-rectifiers, an M3.2 rectifier circuit advantageously produces a phase shift of 180° of the currents flowing through the secondary-side coils arranged on a leg. In this way, a 6-pulse rectifier can be obtained. Interphase transformer circuits are described, for example, in the aforementioned textbook. The feature and a potential advantage of an M3.2 rectifier circuit compared to a B6-bridge circuit is that it supplies only half the DC voltage at twice the DC current for the same voltage load of the converter valves.

Particularly advantageous is an arrangement composed of a first current supply arrangement according to the invention and a second current supply arrangement according to the invention, wherein the three-phase AC current transformer of the first current supply arrangement and the three-phase AC current transformer of the second current supply arrangement are connected to the same phase conductors and wherein the three-phase AC current transformer of the first current supply arrangement is connected in a Delta configuration on the primary side and the three-phase AC current transformer of the second current supply arrangement is connected in a star configuration on the primary side. The primary-side Delta configuration and the primary-side star configuration produces a phase shift of 30° between the currents on the secondary sides of the three-phase transformers. If M3.2 rectifier circuits are connected to the two three-phase AC current transformers, then a 12-pulse output voltage can be obtained at the output of the arrangement composed of the first current supply arrangement and the second current supply arrangement. The outputs of the rectifier or the rectifier circuits are advantageously connected in parallel.

BRIEF DESCRIPTION OF THE SEVERAL VIEWS OF THE DRAWING(S)

Figure 2:
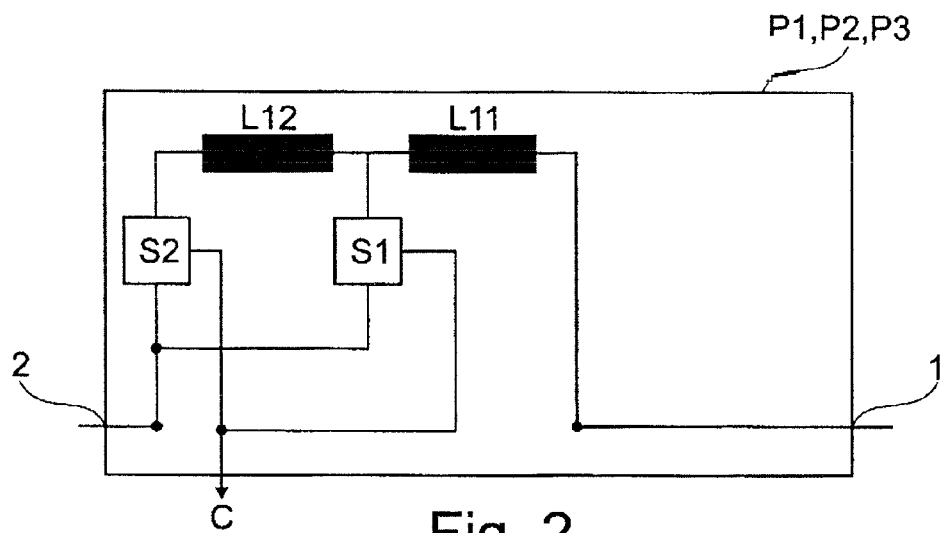
Figure 3:
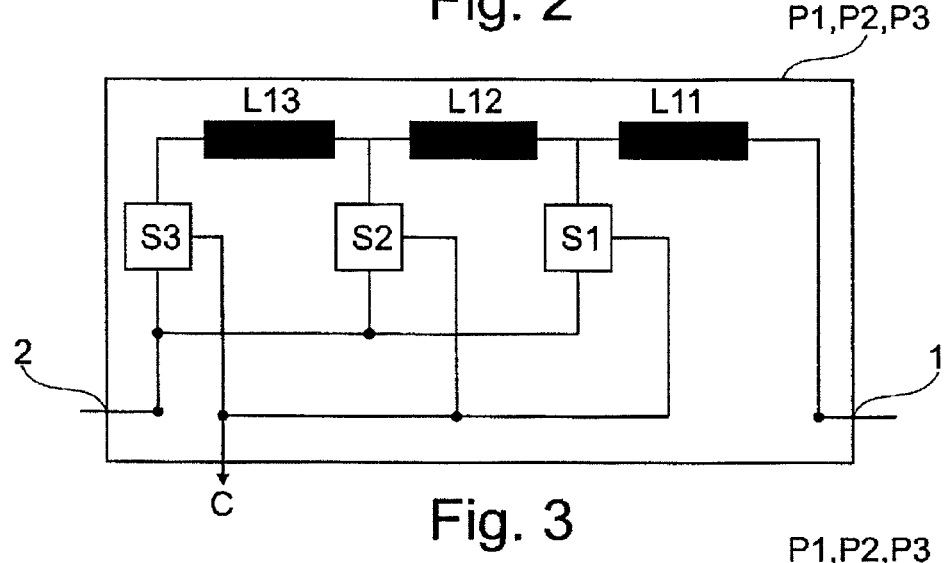
Figure 4:
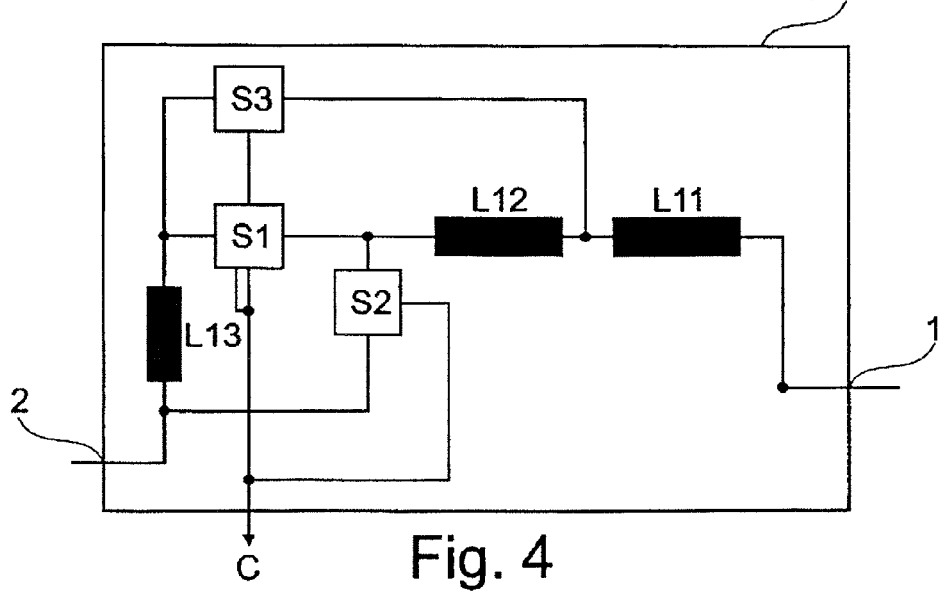
Figure 5:
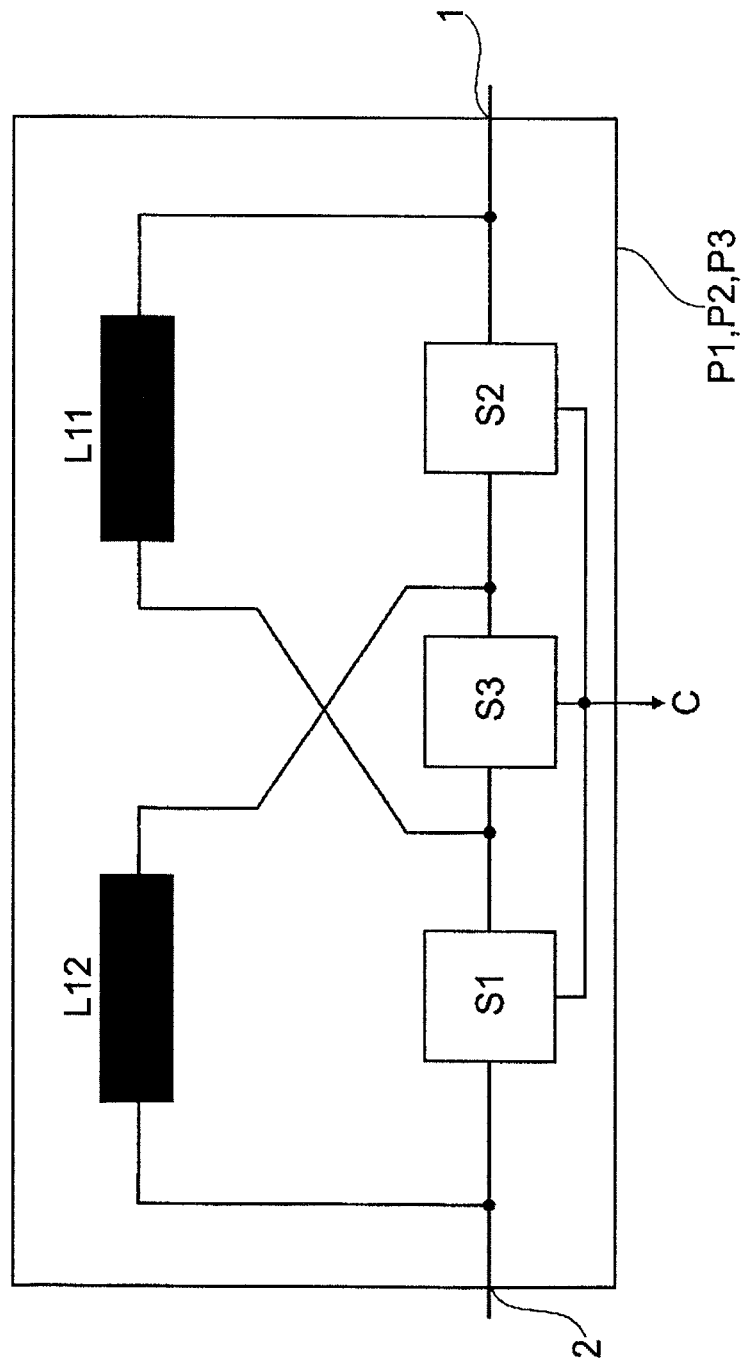
Figure 6:
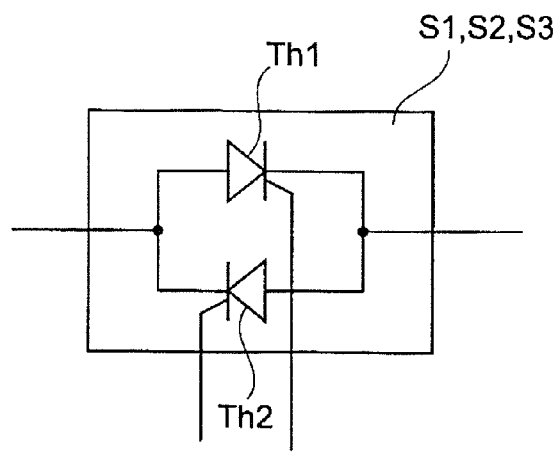
Figure 7:
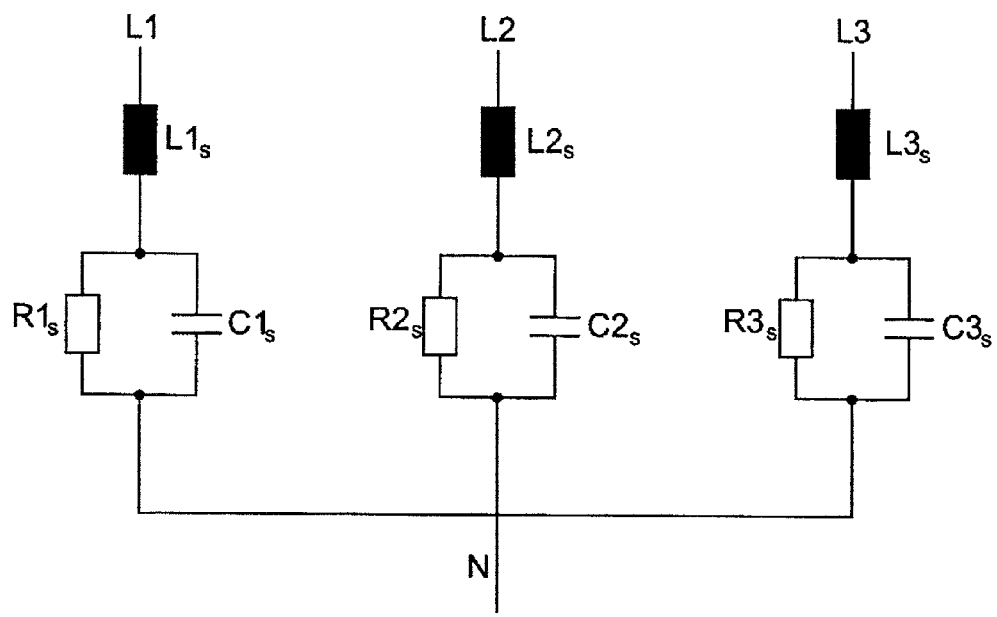

Additional features and advantages of the present invention will become clear based on the following description and with reference to the appended drawings, which show in FIG. 1 a simplified circuit diagram of an arrangement according to the invention consisting of a first switching arrangement according to the invention and a second switching arrangement according to the invention, FIG. 2 a first example for a circuit of primary-side coils of a three-phase AC current transformer and power controllers, FIG. 3 a second example for a circuit of primary-side coils of a three-phase AC current transformer and power controllers, FIG. 4 a third example for a circuit of primary-side coils of a three-phase AC current transformer and power controllers, FIG. 5 a fourth example for a circuit of primary-side coils of a three-phase AC current transformer and power controllers, FIG. 6 the configuration of a power controller, FIG. 7 series resonant circuits for connecting a neutral conductor with phase conductors.

DETAILED DESCRIPTION OF THE INVENTION

Referring to FIG. 1, the first circuit arrangement A according to the invention which is illustrated in the top half of the Figure will be described, before the second circuit arrangement B and the entire arrangement A, B illustrated in FIG. 1 is described.

The first circuit arrangement A illustrated in FIG. 1 includes a first three-phase AC current transformer, with only the secondary side of the transformer explicitly shown. Circuits P1, P2, P3 are shown instead of primary-side coils of the three-phase AC current transformer. FIGS. 2, 3, 4 and 5 illustrate in more detail the configuration of these circuits, wherein each of these Figures shows a possible variant that can be employed in the first circuit arrangement. Each of the circuits P1, P2, P3 illustrated in FIGS. 2, 3, 4 and 5 has a first terminal 1 and a second terminal 2 which are also shown in FIG. 1.

The circuits P1, P2, P3 in the three-phase AC current transformer of the first current supply arrangement A are connected in a Delta configuration and connected to the phase conductors of an AC power grid L1, L2, L3.

The variants for the circuits P1, P2, P3 include at least two primary-side coils L11, L12, L13 of the three-phase AC current transformer of the first circuit arrangement A, which are arranged on a leg of a transformer core of the three-phase AC current transformer. The primary-side coils of the circuit P1 are here arranged on a first leg, the primary-side coils of the circuit P2 on a second leg and the primary-side coils P3 on a third leg.

In the variant illustrated in FIG. 2, two primary-side coils are arranged on each of the three legs of the transformer core of the three-phase AC current transformer, namely a first primary-side coil L11 and a second primary-side coil L12. The first primary-side coil L11 is connected with the first terminal of the circuit P1, P2, P3 and via a node with the second primary-side coil L12. The node is also connected via a power controller S1 with the second terminal 2 of the circuits P1, P2, P3. The second primary-side coil L12 is likewise connected via a power controller S2 with the second terminal 2 of the circuit P12, P23, P31. The first terminal 1 and the second terminal 2 are connected with one of the phase conductors L1, L2, L3 in the manner illustrated in FIG. 1. The power controllers S1, S2 are connected via control terminals with a controller C illustrated in FIG. 1. However, the connecting lines for control are not shown in FIG. 1 so as not to obscure the drawing.

The variant shown in FIG. 3 is different from the variant shown in FIG. 2 in that the three primary-side coils L11, L12, L13 are arranged on a leg of the three-phase AC current transformer. The third primary-side coil L3 is connected in series with a power controller S3. This series connection is parallel to the power controller S2 and is thus also connected with the second terminal of the circuits P1, P2, P3.

The primary-side coils L11, L12 in the variant according to FIG. 2 is the primary-side coils L11, L12, L13 can therefore be realized with a transformer winding having a center tap or two center taps forming the nodes between the primary-side coils L11, L12, L13.

Preferably, thyristor controllers with two anti-parallel connected thyristors Th1, Th2 are employed as power controllers S1, S2, S3, as shown in FIG. 5. However, Triacs, IGBT's or other suitable controllable switches can also be used.

The power controllers S1, S2 and S1, S2, S3, respectively, may be operated with full output. They then operate as controllable switches for switching the primary-side number of turns of the three-phase AC current transformer. However, phase-angle control could advantageously also be enabled. In this case, not only the number of turns can be changed, but also the power that can be transmitted with the three-phase AC current transformer. Preferably, the power controllers are then controlled in voltage sequence control, as described, for example, in the textbook "Thyristorized Power Controller", G. K. Dubey, S. R. Doradla, A. Joshi, R. M. K. Sinha, ISBN 0-85226-190-x, in the section 5.1.4 "Sequence Control of AC Regulators."

The variant of the circuits P1, P2, P3 illustrated in FIG. 4 has likewise three primary-side coils L11, L12, L13 and three power controllers S1, S2, S3. However, the topology of the circuit is different from that of the variant illustrated in FIG. 3. The power controllers S1, S2, S3 and the coils L11, L12, L13 are arranged such that the coils L11, L12, L13 are connected in series with the power controller S1 when the power controllers S2, S3 are switched off. The power can then be adjusted with the power controller S1.

Conversely, if the power controller S1 is switched off and the two power controllers S2, S3 are operating, then the second primary-side coil L12 is connected in series with the power controller S2 and the third primary-side coil L13 is connected in series with the power controller S3. The series connections L12, S2 and L13, S3, respectively, are connected in parallel and then connected in series with the first primary-side coil L11. The power controllers S2, S3 can then be operated synchronously for adjusting the power to be transmitted.

The power controllers of the third variant can also be operated at full power as controllable switches, in phase-angle control or in voltage sequence control for adjusting the primary-side number of turns and optionally the power.

In the fourth variant of the circuits P1, P2, P3 illustrated in FIG. 5, a first primary-side coil L11, a second primary-side coil L12, a first power controller S1, a second power controller S2 and a third power controller S3 are connected such that when the first power controller S1 is controlled, only the first primary-side coil L11 is used to transmit electrical energy from the primary side to the secondary side of the three-phase AC current transformer, and that when the second power controller S2 is controlled, only the second primary-side coil L12 is used to transmit electrical energy. Conversely, wherein the third power controller S3 is controlled, primary-side current flows through both primary-side coils L11, L12. If the primary-side coils L11, L12 have different dimensions, then three transformer ratios of the three-phase AC current transformer can be adjusted with the fourth variant of the circuit P1, P2, P3 having two primary-side coils and three power controllers S1, S2, S3 as means for changing the transformer ratio.

The power controllers S1, S2, S3 in the fourth variant can also be operated at full power as controllable switches, in phase-angle control or in voltage sequence control for adjusting the primary-side number of turns and optionally the power.

The secondary side of the three-phase AC current transformer of the first current supply arrangement includes two coils on each of the first leg, the second leg and the third leg, namely a corresponding first secondary-side coil L21, L22, L23 and a corresponding second secondary-side coil L21', L22', L23', wherein the coils L21, L21' are arranged on the first leg, the coils L22, L22' on the second leg, and the coils L23, L23' on the third leg.

The first secondary-side coils L21, L22, L23 are connected in a star configuration. The terminals of the first secondary-side coils L21, L22, L23 which are not connected to the star point are each connected to a corresponding first converter valve D1, D2, D3. The converter valves are implemented as diodes D1, D2, D3, with the cathodes of the diodes D1, D2, D3 being connected to the terminals of the first secondary-side coils L21, L22, L23 and the anodes being connected together. The first secondary-side coils L21, L22, L23 and the converter valves D1, D2, D3 are connected to form a first M3 rectifier.

The second secondary-side coils L21', L22', L23' are also connected in a star configuration. The terminals of the first secondary-side coils L21', L22', L23' that are not connected to the star point are each connected to a corresponding first converter valve D1', D2', D3'. The converter valves are also implemented as diodes D1', D2', D3', with the cathodes of the diodes D1', D2', D3' being connected to the terminals of the second secondary-side coils L21', L22', L23' and the anodes being connected together. The second secondary-side coils L21', L22', L23' and the converter valves D1', D2', D3' are connected to form a second M3 rectifier.

The first secondary-side coil L21, L22, L23 arranged on a leg and the second secondary-side coil L21', L22', L23' arranged on the same leg have a phase offset of 180°, and the star points of the first M3 rectifier and the second M3 rectifier are connected with one another via an inductor Lk. The inductor Lk is also referred to as interphase transformer and has a center tap which is connected to a negative terminal A− of an output of the first current supply arrangement A. A positive terminal A+ of the first current supply arrangement A is connected to the cathodes of the first and second converter valves D1, D2, D3, D1', D2', D3'. The first M3 rectifier and the second M3 rectifier form in this manner an M3.2 rectifier, which is also referred to in the technical literature as interphase transformer circuit.

The second current supply arrangement B, which is illustrated in the bottom half of FIG. 1, corresponds in many aspects to the first current supply arrangement illustrated in the top half. In particular, it includes a three-phase AC current transformer corresponding to the three-phase AC current transformer of the first current supply arrangement A. The components of the three-phase transformers therefore have the same reference symbols. The secondary side of the transformer of the second current supply arrangement B, i.e. the first and second coils L21, L22, L23, L21', L22', L23', is also connected with converter valves D1, D2, D3, D1', D2', D3' and an inductor Lk to an M3.2 rectifier, like the secondary side of the three-phase AC current transformer of the first circuit arrangement. The outputs of both M3.2 rectifiers are connected in parallel.

The circuits P1, P2, P3 on the primary side of the three-phase AC current transformer of the second current supply arrangement B are configured in the same way as the primary side of the three-phase AC current transformer of the second current supply arrangement A, differing only in the arrangement of the circuits P1, P2, P3. Whereas the circuits P1, P2, P3 of the first current supply arrangement A are arranged in a Delta configuration, the circuits P1, P2, P3 in the second current supply arrangement B are arranged in a star configuration. This causes the currents and voltages on the secondary side of the three-phase AC current transformer of the second current supply arrangement B to be shifted by 30° relative to the secondary side of the three-phase AC current transformer of the first current supply arrangement A.

As a result, a 12-pulse DC voltage is present at the output A+, A− of the entire arrangement A, B.

The star configuration of the circuits P1, P2, P3 can be implemented without a neutral conductor, as illustrated in FIG. 1. However, the star point N can also be connected with the phase conductors L1, L2, L3. This is advantageously implemented, as illustrated in FIG. 7, with series resonant circuits composed of inductors L1s, L2s, L3s and capacitors C1s, C2s, C3s so as to prevent feedback to the power grid due to harmonics. Ohmic resistors R1s, R2s, R3s can be connected in parallel with the capacitors C1s, C2s, C3s.

The invention claimed is:

1. A current supply arrangement (A, B) for rectifying three-phase current into multi-phase current, the arrangement comprising:
at least one three-phase AC current transformer with a transformer core or three single-phase AC current transformers, each having a transformer core,
wherein
the three-phase AC current transformer comprises three first secondary-side coils (L21, L22, L23), with each coil being arranged on a corresponding leg of the transformer core, or each of the three single-phase AC current transformers comprises a first secondary-side coil, wherein each secondary side coil is arranged on a leg of the transformer cores,
at least one first rectifier comprising first converter valves (D1, D2, D3),
wherein
the first converter valves (D1, D2, D3) are connected to the first secondary-side coils (L21, L22, L23) to form the first rectifier,
wherein the current supply arrangement (A, B) comprises three primary-side circuits (P1, P2, P3), wherein each primary-side circuit (P1, P2, P3) comprises three primary-side coils (L11, L12, L13), and means (S1, S2, S3) for changing the transformer ratio of the three-phase AC current transformer or the transformer ratios of the three single-phase AC current transformers, wherein the primary-side coils (L11, L12, L13) of each primary-side circuit (P1, P2, P3) are arranged on a respective leg of the transformer core, wherein the primary-side circuits (P1, P2, P3) are connected to one another in a delta or star configuration;
wherein the means (S1, S2, S3) for changing the transformer ratio of the three-phase AC current transformer or the transformer ratios of the three single-phase AC current transformers controls power on the primary side, without controlling power on the secondary side,
wherein the three-phase AC current transformer is connected on the primary side in a star configuration having a primary-side star point (N),
wherein the primary-side star point (N) is connected with phase conductor terminals (L1, L2, L3) of the current supply arrangement (A) by way of corresponding series resonance circuits, wherein the current supply arrangement (A, B) further comprises: a first means (S1) for changing the transformer ratio of the three-phase AC current transformer or the transformer ratios of the three single-phase AC current transformers electrically connected to a third primary-side coil (L13) and electrically connected to a second primary-side coil (L12); a second means (S2) for changing the transformer ratio of the three-phase AC current transformer or the transformer ratios of the three single-phase AC current transformers electrically connected to the third primary-side coil (L13) and electrically connected to the second primary-side coil (L12); a third means (S3) for changing the transformer ratio of the three-phase AC current transformer or the transformer ratios of the three single-phase AC current transformers electrically connected to the third primary-side coil (L13) and electrically connected between the second primary-side coil (L12) and a first primary-side coil (L11).

2. The current supply arrangement (A, B) according to claim 1, wherein the three-phase AC current transformer comprises three first primary-side coils (L11) and three second primary-side coils (L12) which are each arranged together with one of the first secondary-side coils (L21) on a leg of the transformer core, or each of the three single-phase AC current transformers comprises a first primary-side coil and a second primary-side coil on one of the legs of its transformer core, the means (S1, S2, S3) for changing the transformer ratio of the three-phase AC current transformer or of the three single-phase AC current transformers comprise controllable switches (Th1, Th2) and with the controllable switches (Th1, Th2) each second primary-side coil (L12) is connected directly or indirectly in series with the first primary-side coil (L11) on the same leg of the three-phase AC current transformer, or on the same transformer core of one of the single-phase AC current transformers.

3. The current supply arrangement (A, B) according to claim 2, wherein the current supply arrangement (A, B) comprises three third primary-side coils (L13) and with the controllable switches (Th1, Th2) each third primary-side coil (L13) is connected directly or indirectly in series with either the first primary-side coil (L11) or with the first primary-side coil (L11) and the second primary-side coil (L12) on the same leg of the three-phase AC current transformer, or on the same transformer core of one of the single-phase AC current transformers.

4. The current supply arrangement (A, B) according to claim 3, wherein with the controllable switches (Th1, Th2) a parallel connection of the second primary-side coil (L12) and the third primary-side cod (L13) can be connected in series with the first primary-side coil (L11) on the same leg of the three-phase AC current transformer, or on the same transformer core of one of the single-phase AC current transformers.

5. The current supply arrangement (A, B) according to claim wherein the means (S1, S2, S3) for changing the transformer ratio of the three-phase AC current transformer or the transformer ratios of the three single-phase AC current transformers for the current supply arrangement (A, B) comprises power controllers (S1, S2, S3) used to adjust the power transmitted from the primary side of the three-phase AC current transformer to its secondary side, or from the primary sides of the three single-phase AC current transformers to their secondary sides.

6. The current supply arrangement (A, B) according to claim 2, wherein the means (S1, S2, S3) for changing the transformer ratio of the three-phase AC current transformer or the transformer ratios of the three single-phase AC current transformers comprise the controllable switches (Th1, Th2).

7. The current supply arrangement (A, B) according to claim 5, wherein the current supply arrangement (A, B) comprises a control means (C), with which the power controllers (S1, S2, S3) is controlled in voltage sequence control.

8. The current supply arrangement (A) according, to claim 1, wherein the three-phase AC current transformer is connected on the primary side in a Delta configuration.

9. The current supply arrangement (A, B) according to claim 1, wherein the first converter valves (D1, D2, D3) are connected with the first secondary-side coils (L21, L22, L23) to form a first M3 rectifier.

10. The current supply arrangement (A, B) according to claim 9, wherein the three-phase AC current transformer comprises three second secondary-side coils (L21', L22', L23'), which are each arranged on a corresponding leg of the transformer core,
wherein the current supply arrangement comprises at least one second rectifier having second converter valves (D1', D2', D3'), and
wherein the second converter valves (D1', D2', D3') are connected with the second secondary-side coils (L21', L22', L23') to form a second rectifier.

11. The current supply arrangement (A, B) according to claim 10, wherein the second converter valves (D1', D2', D3') are connected with the second secondary-side coils (L21', L22', L23') to form a second M3 rectifier.

12. The current supply arrangement (A, B) according to claim 11, the first secondary-side coils (L21, L22, L23) and the second secondary-side coils (L21', L22', L23') each being arranged in a star configuration and each having a secondary-side star point, wherein the first M3 rectifier and the second M3 rectifier are connected via an inductor between the secondary-side star points of the respective first secondary-side coils (L21, L22, L23) and the second secondary-side coils (L21', L22', L23') to form an M3.2 rectifier circuit.

13. An arrangement for rectifying three-phase current into multi-pulse DC current, the arrangement comprising
a first current supply arrangement (A) comprising:
at least one three-phase AC current transformer with a transformer core or three single-phase AC current transformers, each having a transformer core,
wherein the three-phase AC current transformer comprises three first secondary-side coils (L21, L22, L23), with each coil being arranged on a corresponding leg of the transformer core, or each of the three single-phase AC current transformers comprises a first secondary-side coil, wherein each secondary side coil is arranged on a leg of the transformer cores,
wherein the current supply arrangement (A, B) comprises three primary-side circuits (P1, P2, P3),
wherein each primary-side circuit (P1, P2, P3) comprises primary-side coils (L11, L12, L13), and means (S1, S2, S3) for changing the transformer ratio of the three-phase AC current transformer or the transformer ratios of the three single-phase AC current transformers,
wherein the primary-side coils (L11, L12, L13) of each primary-side circuit (P1, P2, P3) are arranged on a respective leg of the transformer core,
wherein the primary-side circuits (P1, P2, P3) are connected to one another in a Delta or star configuration, and
a second current supply arrangement (B),
wherein the three-phase AC current transformer is connected on the primary side in a star configuration having a primary-side star point (N),
wherein the primary-side star point (N) is connected with phase conductor terminals (L1, L2, L3) of the current supply arrangement (A) by way of corresponding series resonance circuits,
wherein each of the first and second current supply arrangements (A, B) further comprise:
a first M3 rectifier comprising first converter valves (D1, D2, D3) connected to the first secondary-side coils (L21, L22, L23);
wherein the three-phase AC current transformer comprises three second secondary-side coils (L21', L22', L23"), which are each arranged on a corresponding leg of the transformer core; the current supply arrangement comprises a second M3 rectifier having second converter valves (D1', D2', D3') connected with the second secondary-side coils (L21', L22', L23');
the first secondary-side coils (L21, L22, L23) and the second secondary-side coils (L21', L22', L23') each being arranged in a star configuration and each having a secondary-side star point, wherein the first M3 rectifier and the second M3 rectifier are connected via an inductor between the secondary-side star points of the respective first secondary-side coils (L21, L22, L23) and the second secondary-side coils (L21', L22', L23') to form a M3.2 rectifier circuit;
wherein the three-phase AC current transformer of the first current supply arrangement (A) and the three-phase AC current transformer of the second current supply arrangement (B) are connected in parallel, and outputs of the M3.2 rectifier circuits, respectively, are connected in parallel via the respective inductors;
wherein the at least two means (S1, S2, S3) for changing the transformer ratio of the three-phase AC current transformer or the transformer ratios of the three single-phase AC current transformers controls power on the primary side, without controlling power on the secondary side, wherein the current supply arrangement (A, B) further comprises: a first means (S1) for changing the transformer ratio of the three-phase AC current transformer or the transformer ratios of the three single-phase AC current transformers electrically connected to a third primary-side coil (L13) and electrically connected to a second primary-side coil (L12); a second means (S2) for changing the transformer ratio of the three-phase AC current transformer or the transformer ratios of the three single-phase AC current transformers electrically connected to the third primary-side coil (L13) and electrically connected to the second primary-side coil (L12); a third means (S3) for changing the transformer ratio of the three-phase AC current transformer or the transformer ratios of the three single-phase AC current transformers electrically connected to the third primary-side coil (L13) and electrically connected between the second primary-side coil (L12) and a first primary-side coil (L11).

14. A current supply arrangement (A, B) for rectifying three-phase current into multi-phase current, the arrangement comprising:
- at least one three-phase AC current transformer with a transformer core or three single-phase AC current transformers, each having a transformer core, wherein the three-phase AC current transformer comprises three first secondary-side coils (L21, L22, L23), with each coil being arranged on a corresponding leg of the transformer core, or each of the three single-phase AC current transformers comprises a first secondary-side coil, wherein each secondary-side coil is arranged on a leg of the transformer cores,
- at least one first rectifier comprising first converter valves (D1, D2, D3),
- wherein the first converter valves (D1, D2, D3) are connected to the first secondary-side coils (L21, L22, L23) to form the first rectifier,
- wherein the current supply arrangement (A, B) comprises means (S1, S2, S3) for changing the transformer ratio of the three-phase AC current transformer or the transformer ratios of the three single-phase AC current transformers, each of the means (S1, S2, S3) connecting three primary-side coils (L11, L12, L13) to a common terminal;
- wherein the means (S1, S2, S3) for changing the transformer ratio of the three-phase AC current transformer or the transformer ratios of the three single-phase AC current transformers controls power on the primary side, without controlling power on the secondary side,
- wherein the three-phase AC current transformer is connected on the primary side in a star configuration having a primary-side star point (N),
- wherein the primary-side star point (N) is connected with phase conductor terminals (L1, L2, L3) of the current supply arrangement (A) by way of corresponding series resonance circuits, wherein the current supply arrangement (A, B) further comprises: a first means (S1) for changing the transformer ratio of the three-phase AC current transformer or the transformer ratios of the three single-phase AC current transformers electrically connected to a third primary-side coil (L13) and electrically connected to a second primary-side coil (L12); a second means (S2) for changing the transformer ratio of the three-phase AC current transformer or the transformer ratios of the three single-phase AC current transformers electrically connected to the third primary-side coil (L13) and electrically connected to the second primary-side coil (L12); a third means (S3) for changing the transformer ratio of the three-phase AC current transformer or the transformer ratios of the three single-phase AC current transformers electrically connected to the third primary-side coil (L13) and electrically connected between the second primary-side coil (L12) and a first primary-side coil (L11).

* * * * *

UNITED STATES PATENT AND TRADEMARK OFFICE
CERTIFICATE OF CORRECTION

PATENT NO. : 9,136,776 B2  Page 1 of 1
APPLICATION NO. : 13/298481
DATED : September 15, 2015
INVENTOR(S) : Wallmeier et al.

It is certified that error appears in the above-identified patent and that said Letters Patent is hereby corrected as shown below:

In the Claims:

Col. 8, claim 4, line 56, change "cod" to --coil--.

Col. 8, claim 5, line 62, insert --2,-- between "claim" and "wherein".

Col. 9, claim 13, line 47, insert --:-- following "comprising".

Col. 9, claim 13, line 63, insert --three-- between "comprises" and "primary-side".

Col. 10, claim 13, line 43, delete "at least two".

Signed and Sealed this
Nineteenth Day of January, 2016

Michelle K. Lee
*Director of the United States Patent and Trademark Office*